US011650341B2

(12) United States Patent
Ma et al.

(10) Patent No.: US 11,650,341 B2
(45) Date of Patent: May 16, 2023

(54) METHOD AND SYSTEM FOR ANALYZING SEISMIC ACTIVE FIELD BASED ON EXPANSION OF EMPIRICAL ORTHOGONAL FUNCTION

(71) Applicant: Earthquake Agency of Ningxia Hui Autonomous Region, Yinchuan (CN)

(72) Inventors: Heqing Ma, Yinchuan (CN); Mingzhi Yang, Yinchuan (CN); Guofu Luo, Yinchuan (CN); Xiaoqing Xu, Yinchuan (CN); Xiaojun Ma, Yinchuan (CN); Xianwei Zeng, Yinchuan (CN); Fenghe Ding, Yinchuan (CN); Hengzhi Luo, Yinchuan (CN); Pengtao Zhu, Yinchuan (CN)

(73) Assignee: Earthquake Agency of Ningxia Hui Autonomous Region

( * ) Notice: Subject to any disclaimer, the term of this patent is extended or adjusted under 35 U.S.C. 154(b) by 0 days.

(21) Appl. No.: 17/498,067

(22) Filed: Oct. 11, 2021

(65) Prior Publication Data
US 2022/0120926 A1    Apr. 21, 2022

(30) Foreign Application Priority Data
Oct. 16, 2020    (CN) .......................... 202011108712.7

(51) Int. Cl.
*G01V 1/30*    (2006.01)
*G01V 1/00*    (2006.01)

(52) U.S. Cl.
CPC ................ *G01V 1/30* (2013.01); *G01V 1/008* (2013.01); *G01V 2210/60* (2013.01)

(58) Field of Classification Search
CPC ....... G01V 1/30; G01V 1/008; G01V 2210/60
See application file for complete search history.

(56) References Cited

FOREIGN PATENT DOCUMENTS

CN    112114359 B  *  7/2021   ............. G01V 1/288
RU    2510053 C1  *  3/2014

OTHER PUBLICATIONS

Yang et al. ("Research on the seismic strain field before strong earthquakes above M6 in Chinese mainland"; Chinese Journal of Geophysics vol. 60, No. 10, pp. 3804-3814) (Year: 2017).*

(Continued)

*Primary Examiner* — Walter L Lindsay, Jr.
*Assistant Examiner* — Geoffrey T Evans
(74) *Attorney, Agent, or Firm* — Dickinson Wright PLLC

(57) ABSTRACT

A method and system for analyzing a seismically active field based on expansion of an empirical orthogonal function is provided. The research region of the seismic active field is gridded at equal intervals for the preset research region of a seismic active field; a seismic active field function matrix correlated with the research region of the seismic active field spatially and temporally is constructed according to the gridding of the research region of the seismic active field; and the seismic active field function matrix is expanded with an empirical orthogonal function to obtain a main typical field and a temporal factor thereof, and an anomaly on the temporal factor of the seismic active field is analyzed with a method index, a parameter index and an anomaly index.

6 Claims, 1 Drawing Sheet

(56) References Cited

OTHER PUBLICATIONS

English machine translation of research article, Yang et al. ("Research on the seismic strain field before strong earthquakes above M6 in Chinese mainland"; Chinese Journal of Geophysics vol. 60, No. 10, pp. 3804-3814) (Year: 2017).*
English machine translation of Dong et al. (CN 112114359 B) (Year: 2021).*
English machine translation of Ljubushin (RU 2510053 C1) (Year: 2014).*

* cited by examiner

METHOD AND SYSTEM FOR ANALYZING SEISMIC ACTIVE FIELD BASED ON EXPANSION OF EMPIRICAL ORTHOGONAL FUNCTION

CROSS REFERENCE TO RELATED APPLICATION

This patent application claims the benefit and priority of Chinese Patent Application No. 202011108712.7, filed on Oct. 16, 2020, the disclosure of which is incorporated by reference herein in its entirety as part of the present application.

TECHNICAL FIELD

The present disclosure relates to the technical field of seismology, and in particular to a method and system for analyzing a seismic active field based on expansion of an empirical orthogonal function.

BACKGROUND ART

As a natural phenomenon, earthquakes, also known as ground motion and ground vibration, is the vibration caused by the rapid release of energy from the crust, during which seismic waves will be generated. Dislocation and rupture generated along and inside a plate are caused by the squeezing and collision between the plates on the Earth which is the major cause of the earthquakes. The seismology is a comprehensive science for studying topics such as occurrence laws of the earthquakes in solid earth media, propagation laws of the seismic waves and macroscopic consequences of the earthquakes. It is a branch of solid geophysics and a boundary science of the geology and the physics. In order to make better prediction and analysis before the occurrence of the violent earthquakes, and reduce the disaster loss caused by the earthquakes, there is a need for in-depth analysis and research on the complicated seismic phenomena. Therefore, it is necessary to provide a method for analyzing a seismic active field.

SUMMARY

An object of the present disclosure is to provide a method and system for analyzing a seismic active field based on expansion of an empirical orthogonal function, such that better prediction and analysis can be made before the occurrence of violent earthquakes to reduce the disaster loss caused by the earthquakes.

To achieve the above object, a method for analyzing a seismic active field based on expansion of an empirical orthogonal function provided in the present disclosure includes the following steps:

gridding a set research region of a seismic active field at equal intervals, and constructing a corresponding seismic active field function matrix;

expanding the seismic active field function matrix with the empirical orthogonal function to obtain a corresponding typical field and a temporal factor thereof; and analyzing the obtained temporal factor with multiple set indexes according to an analysis requirement.

The gridding a set research region of a seismically active field at an equal interval, and constructing a corresponding seismically active field function matrix may include:

gridding set research period and research region of the seismic active field temporally and spatially at equal intervals to obtain corresponding a plurality of observation periods and a plurality of area elements.

The gridding a set research region of a seismically active field at an equal interval, and constructing a corresponding seismically active field function matrix may further include:

calculating an observed value of each area element in each observation period, and performing matrix calculation to obtain the corresponding seismic active field function matrix correlated with a seismic active random field function.

The expanding the seismically active field function matrix with an empirical orthogonal function to obtain a corresponding typical field and a temporal factor thereof may include:

decomposing the seismic active field function matrix into a sum of orthogonal spatial and temporal functions to obtain a decomposed seismic active field function correlation matrix.

The expanding the seismically active field function matrix with an empirical orthogonal function to obtain a corresponding typical field and a temporal factor thereof may further include:

calculating a plurality of corresponding eigenvalues according to the correlation matrix, substituting the plurality of eigenvalue into a homogeneous equation set to obtain a plurality of corresponding eigenvectors, and sorting the plurality of eigenvalues in a descending order to obtain a plurality of required typical fields, each typical field represents a spatial distribution type of the seismic activity field; the temporal factor reflects time-varying characteristics of the seismic activity element field.

The present disclosure may further provide a system for analyzing a seismic active field based on expansion of an empirical orthogonal function, including function matrix construction module, configured to grid a set research region of a seismic active field at equal intervals, and construct a corresponding seismic active field function matrix;

temporal factor acquisition module, configured to expand the seismic active field function matrix with the empirical orthogonal function to obtain a corresponding typical field and a temporal factor thereof; and seismic active field analysis module, configured to analyze the obtained temporal factor with multiple set indexes according to an analysis requirement.

In some embodiments, the function matrix construction module may include:

period and area element acquisition means, configured to grid set research period and research region of the seismic active field temporally and spatially at equal intervals to obtain corresponding a plurality of observation periods and a plurality of area elements.

Optionally, the function matrix construction module may further include:

period and area element processing means, configured to calculate an observed value of each area element in each observation period, and perform matrix calculation to obtain the corresponding seismic active field function matrix correlated with a seismic active random field function.

According to the specific embodiment provided by the present disclosure, the technical effects of the present disclosure are summarized as follows.

The present disclosure relates to a method for analyzing a seismic active field based on expansion of an empirical orthogonal function. The research period and research region of the seismic active field is gridded at equal intervals for the preset research region of a seismic active field; a seismic active field function matrix correlated with the research region and research period of the seismic active field spatially and temporally is constructed according to the gridding of the research region of the seismic active field; and the seismic active field function matrix is expanded with an empirical orthogonal function to obtain a typical field and a temporal factor thereof, and an anomaly on the temporal factor of the seismic active field is analyzed with a method index, a parameter index and an anomaly index. The method provided by the present disclosure can make a better prediction and analysis before occurrence of violent earthquakes to reduce the disaster loss caused by the earthquakes.

BRIEF DESCRIPTION OF THE DRAWINGS

In order to describe the technical solutions in the embodiments of the present disclosure or in the prior art more clearly, the accompanying drawings required to describe the embodiments or the prior art are briefly described below. Apparently, the accompanying drawings described below are only some embodiments of the present disclosure, and a person of ordinary skill in the art may further obtain other accompanying drawings based on these accompanying drawings without creative efforts.

DETAILED DESCRIPTION OF THE EMBODIMENTS

The embodiments of the present disclosure are described below in detail. Examples of the embodiments are shown in the accompanying drawings. The same or similar numerals represent the same or similar meanings or meanings having the same or similar functions throughout the specification. The embodiments described below with reference to the accompanying drawings are illustrative, which are intended to explain the present disclosure, but should not be understood as limitations of the present disclosure.

In the description of the present disclosure, "multiple" means two or more, unless otherwise specifically defined.

Example 1

Figure 1:
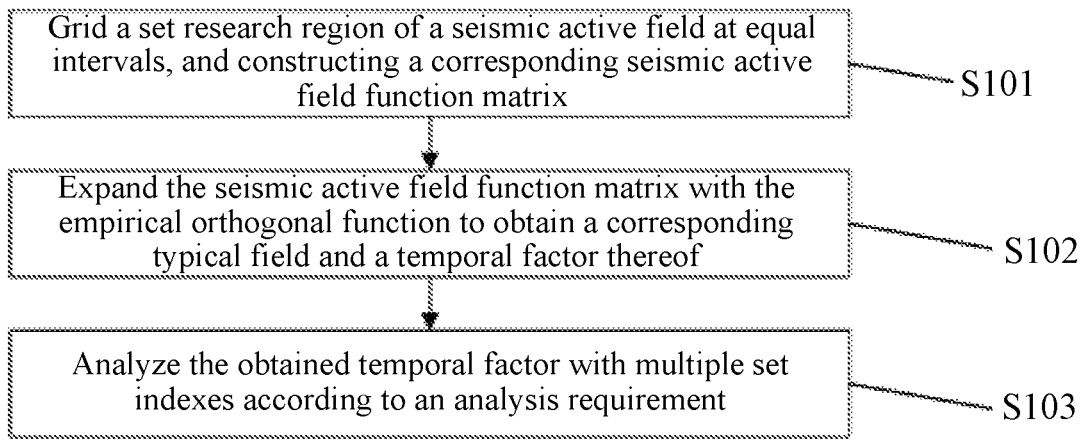
FIG. 1 is a flow chart of a method for analyzing a seismic active field based on expansion of an empirical orthogonal function provided in embodiment 1 of the present disclosure.

Referring to FIG. 1, the method for analyzing a seismic active field based on expansion of an empirical orthogonal function provided in the present disclosure includes the following steps S101-S103.

In step S101, a set research region of a seismic active field is gridded at equal intervals, and a corresponding seismic active field function matrix is constructed.

Specifically, the observables or elements for describing some features of the seismic activity are regarded as a spatial-temporal function, the researched seismic active element field includes the seismic energy field, seismic frequency field, seismic strain field, seismic information entropy field, seismic multi-variable field and the like. The researched seismic active element field has the features of random variables called seismic active field, which is a function $f(x,y,z,t)$ depending on space and time. It is a two-dimensional (2D) plane distribution field if the focal depth variable z is not considered. Supposing that a research region S is provided and a time interval $\Delta t$ is selected, the observation time is divided into m periods, $t_i=\Delta t*i (i=1, 2, \ldots m)$, and the region is divided into n area elements ($j=1, 2, \ldots n$). The observed value $f_{ij}$ ($i=1, 2, \ldots m$, $j=1, 2, \ldots n$) of each area element in each period is counted and considered as a field function value representative of a spatio-temporal coordinate. At this time, the seismic active random field $f$ may be indicated as a matrix form F.

In step S102, the seismic active field function matrix is expanded with an empirical orthogonal function to obtain a corresponding typical field and a temporal factor thereof.

Specifically, the seismic active field function matrix is expanded with the empirical orthogonal function, and decomposed into a sum of an orthogonal spatial function and an orthogonal temporal function, which may be expressed with matrix notations as follows:

$$F=TX \qquad (1)$$

where X represents the spatial function that does not change with time, T represents the temporal function that does not change with space.

$$XX'=I \qquad (2)$$

$$TT'=\Lambda \qquad (3)$$

X' and T' are respectively an inverse matrix of X and T and respectively meet the orthogonality condition and the normalization condition.

The expanded equation (1) is solved by multiplying by T' on the left and X' on the right, and by using equations (2) and (3), the equation (4) is obtained:

$$T'FX'=\Lambda \qquad (4)$$

The above equation is multiplied by X' on the left, and it is noted that F'=X'T'.

Letting the correlation matrix R=FF', to obtain the equation (5).

$$RX'=X'\Lambda \qquad (5)$$

where the matrix R is the correlation matrix of the field, and when the field is the anomaly field, R is the covariance matrix of the active field; and F' is the inverse matrix of F. According to theory of linear algebra, the matrixes $\Lambda$ and X are respectively the feature matrix and the corresponding eigenvector matrix of the matrix R. In this sense, the problem is to solve the eigenvalue and the eigenvector of the matrix R.

The obtained equation (5) is written into the matrix form which is the basic equation for solving the eigenvalue and the eigenvector of the matrix R. Different eigenvalues $\lambda_k$ may generally be substituted into a homogeneous equation set. The condition for a homogeneous equation set to have a non-zero solution is that its coefficient determinant is equal to zero. Therefore, the feature equation of the matrix R may be solved to obtain n roots $\lambda_k$ ($k=1, 2, \ldots n$) called the eigenvalues of the matrix R. The matrix R is a symmetric matrix, and all eigenvalues are positive real numbers which may be sorted in a descending order.

The process of solving the empirical orthogonal function is essentially solving the eigenvalues and eigenvectors of the matrix R=FF'. If the original field F is the actual observed value, anomaly value or standardized variable of the seismic elements, the matrix R will be the cross-product matrix, covariance matrix or correlation coefficient matrix, respectively.

Substituting the k-th eigenvalue into the homogeneous equation set to obtain the corresponding eigenvector, then n eigenvectors corresponding to n eigenvalues may be obtained. The n eigenvectors corresponding to the n eigenvalues form an empirical orthogonal function family which satisfies the orthogonality condition and the normalization condition.

The eigenvectors are merely the function of the spatial coordinates and represent the spatial distribution type of the seismic activity. Such n eigenvectors are called n typical fields of the active field. The expansion of the empirical orthogonal function is to decompose the active field into a superposition of n typical fields, which is to express the active field as a sum for n spatial activity types. Owing to different proportions in the active field, the typical fields are sorted in a descending order according to the corresponding eigenvalues. The typical field corresponding to a large eigenvalue accounts for a large proportion in the active field. As a matter of fact, due to series of the expansion of the empirical orthogonal function converges quickly, several typical fields in the front will account for the main constituents of the active field, that is, the required multiple typical fields. Major features of the active field are embodied in these main typical fields. Therefore, with research on these main typical fields, the spatial-temporal features of the whole seismic active field can be known.

Multiplying X' on the right of equation (1) may obtain the following weight coefficient matrix T of the eigenvector.

$$T=FX'$$

where the element of the matrix T is the temporal weight coefficient of the eigenvector, referred to as the temporal factor of the typical field, X' is the inverse matrix of the X, and F represents the seismic active field. With matrix calculation on the matrix form of the obtained eigenvectors and the seismic active field function matrix, the temporal factors of the corresponding typical fields are obtained. The temporal factor reflects the temporal variation feature of the seismic active element field. The temporal factor sequence of the k-th typical field expresses the temporal variation of the corresponding typical field. From the perspectives of seismic analysis and prediction, the temporal factor serves as an index parameter for analyzing the temporal variation of the seismic active element field. Possible seismic anomalies are explored and discovered by the analysis on the variation features of the temporal factors of the typical fields.

The temporal factor has three features: orthogonality, the average value of the temporal factor of the anomaly field being zero, and the eigenvalue being equal to m times of the variance of the temporal factor.

In step S103, the obtained temporal factor is analyzed with multiple set indexes according to an analysis requirement.

Specifically, the anomaly on the temporal factor of the seismic active field is analyzed with a method index, a parameter index and an anomaly index. The method index has been described in the steps S101 and S102 and will not be repeated herein.

Parameter Indexes

During analysis of the expansion of the empirical orthogonal function, the research region is generally selected around an epicenter at about 3° longitude and latitude, and adjusted appropriately according to specific issues such as the seismic magnitude, structure and seismic activity distribution. Generally, the selected region includes distribution regions of two stages of the seismic activity enhancement and attenuation before the earthquake.

Taking the most researched seismic energy field as an example, in order to obtain the energy matrix, the region is gridded at equal intervals. The size of the grid should enable the energy contour to reflect the energy distribution feature of the region. In case of the dense gridding, the seismic energy distribution patterns represented by the typical fields are fragmented, the major features of the field cannot be highlighted, and the covariance matrix tends to degenerate and the convergence slows down. In case of the sparse gridding, the spatial features of the seismic activity cannot be well reflected, the spatial difference of the seismic activity is weakened, and some important anomaly information may be lost. During the gridding, the seismic activity and other factors should also be considered. Generally, in order to facilitate calculation, the square grid with the longitude and latitude of 0.5°*0.5° can be taken; rectangular or another form of grid area units can also be used according to actual conditions.

Since the study is for the purpose of analyzing the seismic anomaly, not only influences of the stationarity of the field on results, but also development courses and features of the seismic anomaly are considered when the calculation period is selected. In fact, the time of a violent earthquake from genesis to occurrence is unclear. According to existing research results, two or three years before the earthquake may be the abnormally active period of the seismic anomaly, and consequently 10-15 years before the earthquake are usually selected as the time window for research.

Taking the most researched seismic energy field as an example, seismic energy at different magnitudes varies too much. When researching the energy field, it is vital to select the appropriate upper and lower limits of the magnitude. The lower limit depends on the earthquake monitoring capacity of the research region, while the upper limit depends on the upper limit of earthquake magnitude in the normal seismic activity level of the region. In view of great influences of the violent earthquake on the energy field, the recommended upper limit earthquake magnitude is about $M_L$ 5.5.

Anomaly Indexes

Taking the most researched seismic energy field as an example, results of research on nearly 40 violent earthquakes at the magnitude of 6 or more reveal that the anomaly on the temporal factor of the seismic energy field has the following features.

(1) The temporal factor is maintained near 0 in normal conditions, but suddenly rises or falls on a stationary background before the violent earthquake.

(2) The temporal factors of front three or four typical fields of the seismic energy field show the anomaly before the earthquake. The typical fields with the anomaly account for 90% or more in total fields, indicating that the typical fields with the anomaly are main constituents of the seismic energy field.

(3) The earliest time that the anomaly on the temporal factor appeared was about 3 years before the earthquake, and most earthquake anomalies appeared within about 20 months before the earthquake. If the anomalies that occurred within 3 months before the earthquake are regarded as the short-term anomalies, about 50% of earthquakes will show such anomalies before the occurrence.

The main feature of the theory of the seismic active field is that the basic concept of the seismic active field is put forward based on the principle of the random function theory. With the expansion of the empirical orthogonal function, the seismic activity is expressed as the superposition of n independent orthogonal components, in which the typical fields corresponding to the first several maximum eigenvalues account for the main constituents of the total fields. Therefore, by only introducing a few main typical fields and temporal factors thereof, the complicated natural process of seismic activity is described quantitatively and mathematically, and the spatial-temporal features are researched and analyzed. From the current cognitive level, the research process is simple; and the better prediction and analysis can be made before the occurrence of the earthquake to reduce the casualties caused by the earthquakes.

The present disclosure relates to a method for analyzing a seismic active field based on expansion of an empirical orthogonal function. The research region of the seismic active field is gridded at equal intervals for the preset research region of a seismic active field; a seismic active field function matrix correlated with the research region of the seismic active field spatially and temporally is constructed according to the gridding of the research region of the seismic active field; and the seismic active field function matrix is expanded with an empirical orthogonal function to obtain a typical field and a temporal factor thereof, and an anomaly on the temporal factor of the seismic active field is analyzed with a method index, a parameter index and an anomaly index. The method provided by the present disclosure can make a better prediction and analysis before occurrence of violent earthquakes to reduce the disaster loss caused by the earthquakes.

Example 2

Figure 2:
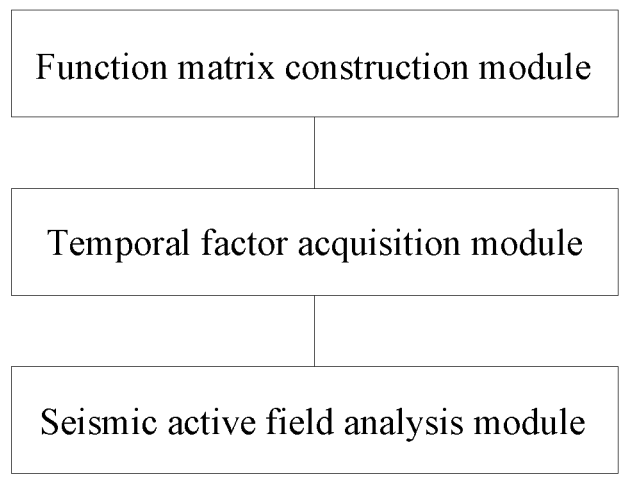
FIG. 2 is a composition schematic diagram of a system for analyzing a seismic active field based on expansion of an empirical orthogonal function provided in embodiment 2 of the present disclosure.

Referring to FIG. 2, the system for analyzing a seismic active field based on expansion of an empirical orthogonal function provided in the present disclosure includes a function matrix construction module, a temporal factor acquisition module and a seismic active field analysis module.

The function matrix construction module is configured to grid a set research region of a seismic active field at equal intervals, and construct a corresponding seismic active field function matrix.

The temporal factor acquisition module is configured to expand the seismic active field function matrix with the empirical orthogonal function to obtain a corresponding typical field and a temporal factor thereof.

The seismic active field analysis module is configured to analyze the obtained temporal factor with multiple set indexes according to an analysis requirement.

In some embodiments, the function matrix construction module may include a period and area element acquisition means.

The period and area element acquisition means is configured to grid set research period and research region of the seismic active field temporally and spatially at equal intervals to obtain corresponding a plurality of observation periods and a plurality of area elements.

In some embodiments, the function matrix construction module may further include a period and area element processing means.

The period and area element processing means is configured to calculate an observed value of each area element in each observation period, and perform matrix calculation to obtain the corresponding seismic active field function matrix correlated with a seismic active random field function.

The above disclosed is only preferred embodiments of the present disclosure, which of course should not limit the scope of the claims of the present disclosure. A person of ordinary skill in the art can understand all or some of the process for implementing the foregoing embodiments and the equivalent changes made according to the claims of the present disclosure still fall within the scope of the present disclosure.

What is claimed is:

1. A method for analyzing a seismic active field based on expansion of an empirical orthogonal function, comprising:

gridding a set research region of a seismic active field at equal intervals, and constructing a corresponding seismic active field function matrix;

expanding the seismic active field function matrix with the empirical orthogonal function to obtain a corresponding typical field and a temporal factor thereof, comprising:

decomposing the seismic active field function matrix into a sum of orthogonal spatial function and temporal function to obtain a decomposed seismic active field function correlation matrix, which is expressed as:

$$F=TX \tag{1}$$

wherein X represents the spatial function that does not change with time, T represents the temporal function that does not change with space; assuming that X' and T' are respectively an inverse matrix of X and T, following orthogonality condition and normalization condition are met:

$$XX'=I \tag{2}$$

$$TT'=\Lambda \tag{3};$$

obtaining a decomposed seismic active field function correlation matrix by:

multiplying by T' on left of equation (1) and X' on right of equation (1) and introducing equations (2) and (3) to obtain equation (4); and multiplying by X' on left of equation (4) and letting F'=X' T' and correlation matrix R=FF' to obtain equation (5):

$$T'F'X'=\Lambda \tag{4}$$

$$RX'=X'\Lambda \tag{5}$$

wherein matrix R is the correlation matrix, and when the seismic active field is an anomaly field, R is a covariance matrix; and F' is an inverse matrix of F; and calculating a plurality of corresponding eigenvalues according to the correlation matrix, substituting the plurality of eigenvalues into a homogeneous equation set to obtain a plurality of corresponding eigenvectors, and sorting the plurality of eigenvalues in a descending order to obtain a plurality of required typical fields, each typical field represents a spatial distribution type of the seismic activity field; the temporal factor reflects time-varying characteristics of a seismic activity element field;

analyzing the temporal factor with multiple set indexes according to an analysis requirement, wherein the analyzing determines whether the temporal factor is an anomaly according to following features:

(1) the temporal factor is maintained near 0 in normal conditions, but rises or falls on a stationary background before an earthquake;

(2) temporal factors of front three or four typical fields of a seismic energy field show the anomaly before the earthquake, and the typical fields with the anomaly account for 90% or more in total fields; and (3) an earliest time that the anomaly on the temporal factor appeared is about 3 years before the earthquake, and most earthquake anomalies appeared within about 20 months before the earthquake, and if the anomalies that occur within 3 months before the earthquake are regarded as short-term anomalies, about 50% of earthquakes show such anomalies before occurrence; and predicting the earthquake based on determination that the temporal factor is the anomaly.

2. The method for analyzing a seismic active field based on expansion of an empirical orthogonal function of claim 1, wherein the gridding a set research region of a seismic active field at equal intervals, and constructing a corresponding seismic active field function matrix comprises:

gridding set research period and research region of the seismic active field temporally and spatially at equal intervals to obtain corresponding a plurality of observation periods and a plurality of area elements.

3. The method for analyzing a seismic active field based on expansion of an empirical orthogonal function of claim 2, wherein the gridding a set research region of a seismic active field at equal intervals, and constructing a corresponding seismic active field function matrix further comprises:

calculating an observed value of each area element in each observation period, and performing matrix calculation to obtain the corresponding seismic active field function matrix correlated with a seismic active random field function.

4. A system for analyzing a seismic active field based on expansion of an empirical orthogonal function, comprising:

a function matrix construction module, configured to grid a set research region of a seismic active field at equal intervals, and constructing a corresponding seismic active field function matrix;

a temporal factor acquisition module, configured to expand the seismic active field function matrix with the empirical orthogonal function to obtain a corresponding typical field and a temporal factor thereof, wherein the temporal factor acquisition module further comprises:

a decomposing unit, configured to decompose the seismic active field function matrix into a sum of orthogonal spatial function and temporal function to obtain a decomposed seismic active field function correlation matrix, which is expressed as:

$$F=TX \quad (1)$$

wherein X represents the spatial function that does not change with time, T represents the temporal function that does not change with space; assuming that X' and T' are respectively an inverse matrix of X and T, following orthogonality condition and normalization condition are met:

$$XX'=I \quad (2)$$

$$TT'=\Lambda \quad (3)$$

an obtaining unit, configured to obtain a decomposed seismic active field function correlation matrix by: multiplying by T' on left of equation (1) and X' on right of equation (1) and introducing equations (2) and (3) to obtain equation (4); and multiplying by X' on left of equation (4) and letting F'=X'T' and correlation matrix R=FF' to obtain equation (5):

$$T'FX'=\Lambda \quad (4)$$

$$RX'=X'\Lambda \quad (5)$$

wherein matrix R is the correlation matrix, and when the seismic active field is an anomaly field, R is a covariance matrix; and F' is an inverse matrix of F; and a calculating unit, configured to calculate a plurality of corresponding eigenvalues according to the correlation matrix, substitute the plurality of eigenvalues into a homogeneous equation set to obtain a plurality of corresponding eigenvectors, and sort the plurality of eigenvalues in a descending order to obtain a plurality of required typical fields, each typical field represents a spatial distribution type of the seismic activity field; the temporal factor reflects time-varying characteristics of a seismic activity element field;

a seismic active field analysis module, configured to analyze the temporal factor with a set index according to an analysis requirement, wherein the seismic active field analysis module is configured to determine whether the temporal factor is an anomaly according to following features:

(1) the temporal factor is maintained near 0 in normal conditions, but rises or falls on a stationary background before an earthquake;

(2) temporal factors of front three or four typical fields of a seismic energy field show anomaly before the earthquake, and the typical fields with the anomaly account for 90% or more in total fields; and (3) an earliest time that the anomaly on the temporal factor appeared is about 3 years before the earthquake, and most earthquake anomalies appeared within about 20 months before the earthquake, and if the anomalies that occur within 3 months before the earthquake are regarded as short-term anomalies, about 50% of earthquakes show such anomalies before occurrence, and an earthquake prediction module, configured to predict the earthquake based on determination that the temporal factor is the anomaly.

5. The system for analyzing a seismic active field based on expansion of an empirical orthogonal function of claim 4, wherein the function matrix construction module comprises:

period and area element acquisition means, configured to grid set research period and research region of the seismic active field temporally and spatially at equal intervals to obtain corresponding a plurality of observation periods and a plurality of area elements.

6. The system for analyzing a seismic active field based on expansion of an empirical orthogonal function of claim 5, wherein the function matrix construction module further comprises:

the period and area element processing means, configured to calculate an observed value of each area element in each observation period, and performing matrix calculation to obtain the corresponding seismic active field function matrix correlated with a seismic active random field function.

* * * * *